April 15, 1952     L. VANLEIRSBERGHE     2,592,769
PORTABLE LEVER ACTUATED TIRE REMOVING TOOL
Filed April 18, 1950

INVENTOR.
LEONARD VANLEIRSBERGHE
BY
Attorney

Patented Apr. 15, 1952

2,592,769

UNITED STATES PATENT OFFICE 2,592,769

PORTABLE LEVER ACTUATED TIRE REMOVING TOOL

Leonard Vanleirsberghe, Maywood, Ill.

Application April 18, 1950, Serial No. 156,637

1 Claim. (Cl. 157—1.26)

My invention refers to stay means used in association with tire removing devices or accessories, and is an improvement on my patent issued March 1, 1949, and designated numerically 2,463,071.

An important object of the instant invention is to provide stay means so that when the lip of a tire is freed from the felly of the wheel thereof, the stay means which is articulately supported on the U-shaped bar means utilized, will fall into operative relationship with respect to the pressure block transmitting the pressure to the lip of a tire freeing it from the felly; thus giving both hands the freedom to operate the pry bar in order to free the entire perimetral portion of the lip of the tire thus freeing it from the wheel. Conversely the said device may also be used for attaching tires.

Another object of my invention is to provide triangular stay means of substantially triangular formation having a base portion and two bearing portions at the apex of the said triangular stay means, each of the said bearings being at varied altitudes from the base of the said triangular stay means in order to accommodate tires of different cross-sectional configurations.

Another object of my invention is to provide stay means of the aforementioned character which is simple in construction, practical in its utilitarian functions, and of such elemental simplicity as to warrant economical manufacture thereof in quantity production.

Other features and objects resident in my invention will become apparent from an examination of the accompanying drawings, bearing further elucidation in the ensuing description, wherein like numerals represent like parts, and in which.

Figures 1, 2, 3:
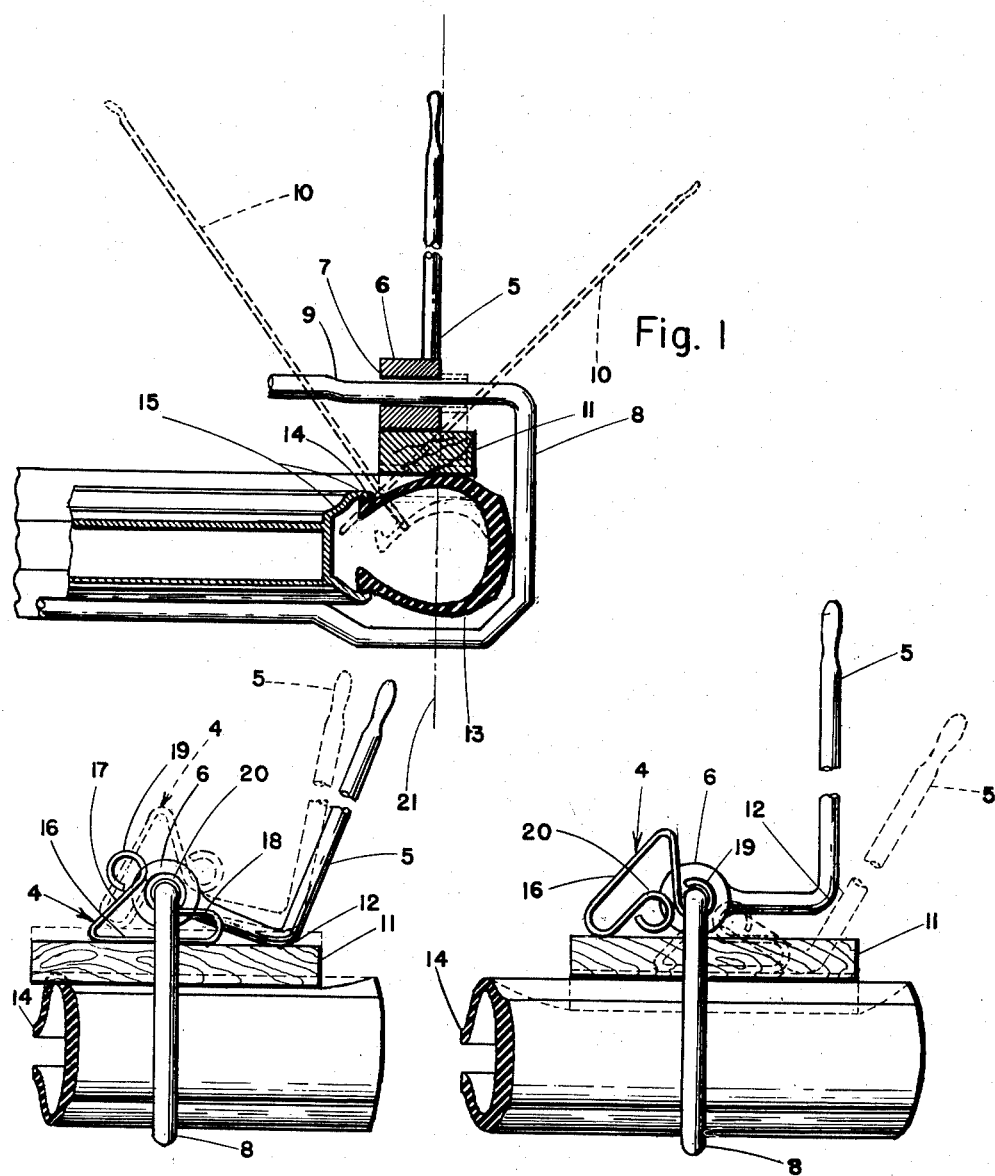
Fig. 1 is a cross-sectional view of a tire rim, the pressure lever, and block comprising my invention in the disclosure of the aforesaid patent showing as well in phantom lines the movements of the pry bar, the pressure lever means, and the stay means.
Fig. 2 is an end view of Fig. 1 showing the stay means in normal position, or inoperative position, and showing in dotted lines when pressure is applied by the manipulating lever, and the stay means holding the pressure block in pressure relationship to a tire.
Fig. 3 is a view similar to Fig. 2 showing the stay means in operative position when its bearing portion nearest its base is articulately connected to the U-shaped arm.

Referring to the various views, it will be seen that a manipulating lever, or a pressure exerting lever 5, is provided having a bearing 6, which has an enlarged opening 7 in order that it may be removed easily over the bent stop portion 9 in the U-shaped support designated 8. The pressure block 11 is positioned intermediate the side wall of the tire 13 and the bearing 6 so as to effectuate a pressure thereon by the knee 12 of the manipulating lever 5. The lip 14 of the tire is thus freed, when subjected to pressure, from the felly 15 of the tire wheel. A pry bar 10 shown in dotted lines is interposed therein in order to facilitate lifting and freeing the lip 14 from the felly 15 subsequently the tire tool 10 is manipulated until the entire lip is freed from one side of the felly 15, the same operation being continued until the opposite lip is also removed. The tool may also be used for mounting tires.

In order to afford greater facility for doing the work, I found it advisable to provide a stay means generally designated 4 of substantially triangular formation consisting of a base 16 sides 17 and 18 and bearing portions 19 and 20 at varied altitudes from the said base 16 for purposes which will hereinafter appear.

It is to be noted that the central line of the cross-sectional portion of the tire 21 is tangent to the side of the manipulating lever 5 and also to the inner side of the triangular stay fixture generally designated 4, so that the effective pressures will be applied within the vicinity of the central line of the tire 13 where the pressure is most effective.

In Fig. 2 is shown the normal position of the stay means 4 when it is mounted on the bearing portion 19. When the knee 12 applies sufficient pressure compressing the tire 13, then the stay means 4 will rotate into place and assume a position similar to that shown in Fig. 3 which will leave the hands free for applying the pressure with the lever 10 so that the lip 14 may be freed from the felly 15.

With the patented device, it was necessary to hold the lever under pressure with one hand and manipulate the lip-lifting lever 10 with the other hand. With the use of the stay means that is facilitated in view of the fact that both hands become free, in order to engage the lever 10 and apply greater pressure for more rapidly and more efficiently removing the lip 14 from the felly 15.

For tires of various cross-sectional dimensions, either the bearing portion 19 is utilized to suspend the stay fixture 4, or the bearing portion 20 is relied upon for use with larger tires as indicated in Fig. 3.

Although I have herein described rather succinctly the nature and use of my invention so that persons skilled in the art will have no difficulty apprising themselves of the teachings thereof and, inasmuch as the disclosure is susceptible of various alterations, modifications, and improvements, I hereby reserve the right to all modifications, alterations, and improvements falling within the scope and spirit of my invention, as well as any modifications that are embraced suggestively in the accompanying drawings, and any that may come within the purview of the foregoing description; my invention to be limited only by the appended claim.

Having thus disclosed and revealed my invention, what I claim as new and desire to secure by Letters Patent is:

A device of the character described comprising, a U shaped support having a slight offset portion on a leg thereof, a lever element provided with a sleeve on one end thereof and having an enlarged bore therein slidably and removably journaled on the said leg for rotation thereon as an axis, the said lever element provided with a pressure knee portion intermediate its ends, the plane of operation of the said lever element being disposed at right angles to the plane of the said U shaped support, a pressure block associated with said U shaped support and the said lever element adapted to exert pressure on a body introduced into the said U shaped support when force is applied to the free end of the said lever element, and stay means of triangular formation having an enlarged bore at its apex slidably and removably journaled on the said leg for rotation thereon as an axis at a point adjacent the said lever element, the said stay means being capable of rotating into place after pressure is exerted by the said lever causing its base to rest on the said pressure block to relieve the said lever and to hold the said pressure block in depressed position.

LEONARD VANLEIRSBERGHE.

REFERENCES CITED

The following references are of record in the file of this patent:

UNITED STATES PATENTS

| Number | Name | Date |
| --- | --- | --- |
| 1,116,468 | Nelson | Nov. 10, 1914 |
| 1,270,965 | Markham | July 2, 1918 |
| 1,378,787 | Harbert | May 17, 1921 |
| 1,482,304 | Hoag | Jan. 29, 1924 |
| 2,463,071 | Vanleirsberghe | Mar. 1, 1949 |